United States Patent [19]

Keznickl et al.

[11] 4,214,268
[45] Jul. 22, 1980

[54] METHOD AND APPARATUS FOR VIDEO RECORDING A FILM SCAN SIGNAL

[75] Inventors: Eduard Keznickl; Kurt Boehm, both of Vienna, Austria

[73] Assignees: Karl Vockenhuber; Raimund Hauser, both of Vienna, Austria

[21] Appl. No.: 946,777

[22] Filed: Sep. 28, 1978

[30] Foreign Application Priority Data

Oct. 3, 1977 [CH] Switzerland ............... 012042/77

[51] Int. Cl.² .............................................. H04N 5/76
[52] U.S. Cl. ..................................... 358/127; 358/216
[58] Field of Search ................... 358/127, 130–132, 358/216, 214; 360/37; 179/100.3 R; 346/110 R

[56] References Cited

U.S. PATENT DOCUMENTS

| | | | |
|---|---|---|---|
| 3,190,955 | 6/1965 | Maurer | 360/14 |
| 3,621,121 | 11/1971 | Eckenbrecht | 358/216 |
| 3,707,599 | 12/1972 | Brown | 358/216 |
| 3,752,918 | 8/1973 | Kurahashi | 358/216 |
| 3,767,852 | 10/1973 | Horowitz | 358/216 |
| 3,790,707 | 2/1974 | Valenta | 358/216 |

Primary Examiner—Bernard Konick
Assistant Examiner—Alan Faber
Attorney, Agent, or Firm—Martin A. Farber

[57] ABSTRACT

A method for TV recording of pictures from a moving picture film which is continuously moved relative to a recording screen, the pictures of the film each being periodically scanned linewise, whereby the moving picture frequency with respect to the scanning frequency is in a predetermined relation with respect to each other for the purpose of achieving a predetermined recording picture frequency, for example of 50 pictures per second. With different moving picture frequencies ($f_L$) the following relationship with respect to the scanning frequency ($f_A$) is maintained:

$$f_L + f_A = +F$$

in which F means the desired recording picture frequency, whereby at least with one of the moving picture frequencies which is used, fractions of a picture are scanned per scanning period, which fractions differ from 1 picture, particularly exceeding 1.

12 Claims, 8 Drawing Figures

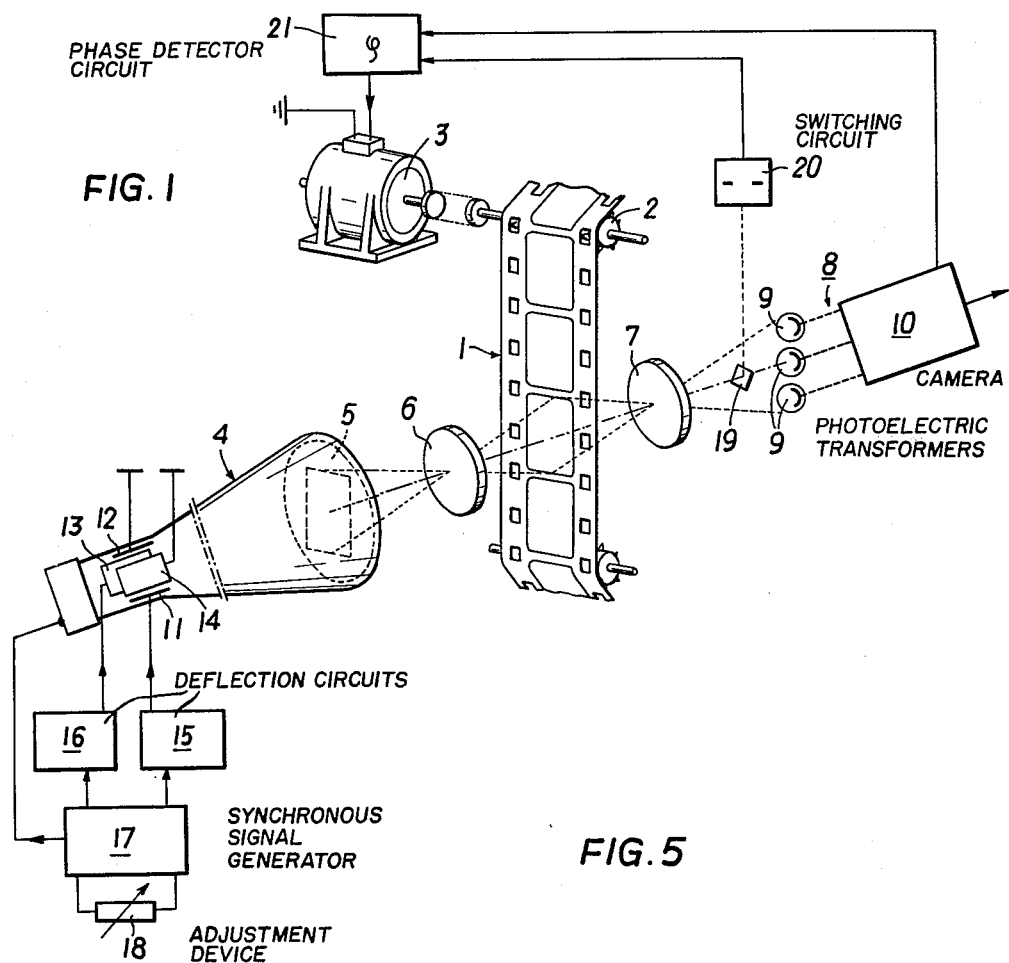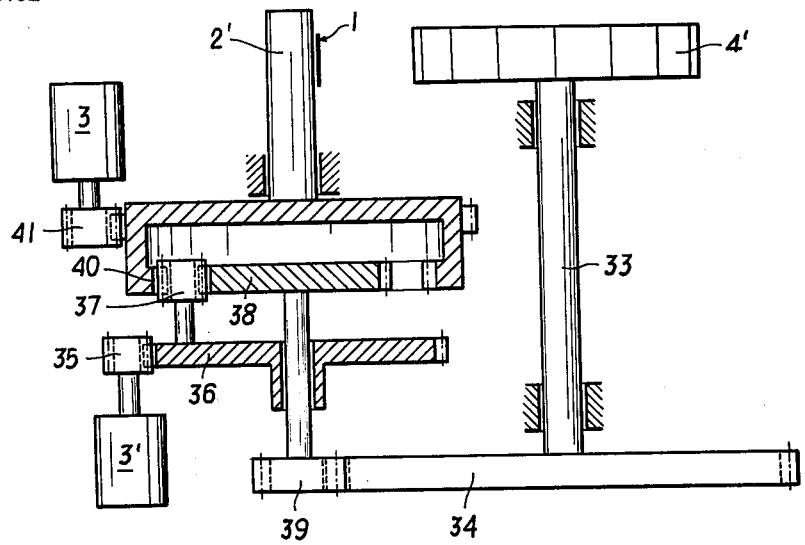

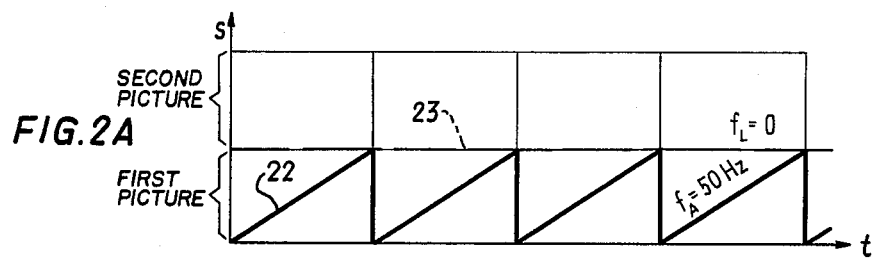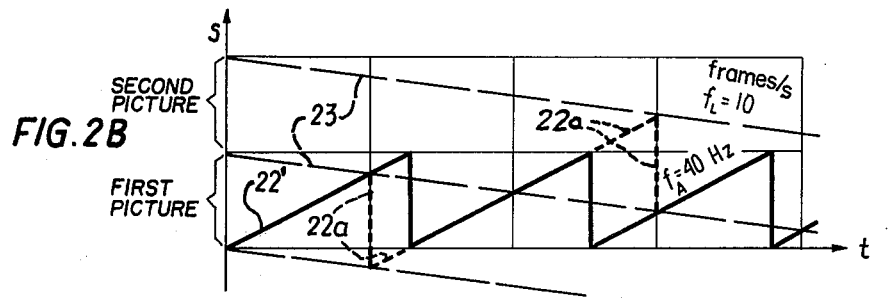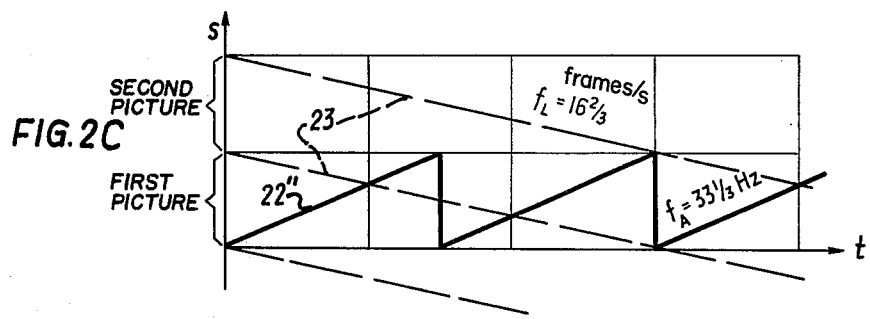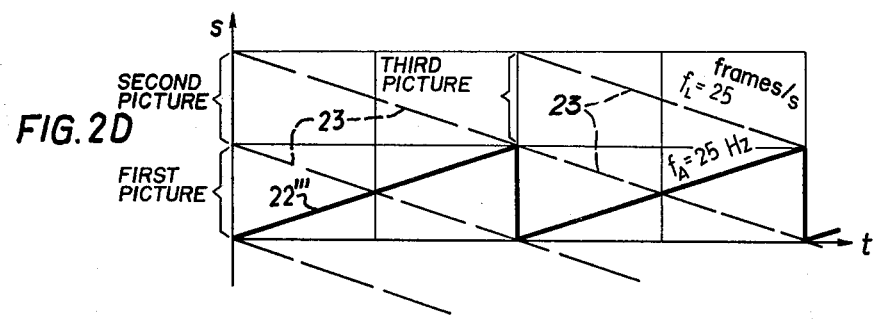

METHOD AND APPARATUS FOR VIDEO RECORDING A FILM SCAN SIGNAL

The invention relates to a method for TV or video recording of pictures from a moving or movie picture film which is continuously moved relative to a recording screen, the pictures of the film each being periodically scanned linewise, whereby the moving picture frequency with respect to the scanning frequency is in a predetermined relation with respect to each other for the purpose of achieving a predetermined recording picture frequency, for example of 50 pictures per second.

Such a method for example is known from Austrian Pat. No. 310,832, which shows a device, by the aid of which a film which is transported with 25 pictures per second is fed by scanning by means of a tilting mirror to a video recording device, whereby by means of double scanning of each picture, a recording picture frequency of 50 pictures per second is produced. This Austrian patent however does not deal with the problem which occurs with different moving picture frequencies. For such a case in any event it is known from U.S. Pat. Nos. 2,261,848 and 3,707,599 to arrange the sawtooth signals which control the scanning offset or displaced in height, in order thus to follow up the scanning of the moving picture movement. In any event this produces a comparatively expensive circuit, by means of which the respective position of a picture which is to be scanned is determined and after this the sawtooth impulse is followed up or adjusted with respect to its level. (The previous mentioned patents are incorporated herein by reference).

It is an object of the invention to make possible different moving picture frequencies without consequently having to accept a complicated control as a compromise.

According to the invention this is achieved in the manner that with different moving picture frequencies ($f_L$) the following relationship with respect to the scanning frequency ($f_A$) is maintained:

$$f_L + f_A = +F$$

in which F means the desired recording picture frequency, whereby at least with one of the moving picture frequencies which is used, fractions of a picture are scanned per scanning period, which fractions differ from 1 picture, particularly exceeding 1. In the above formula +F means that independent of the sign of the two terms of the summation the result must be positive. Even during return movement or reverse of the picture with a certain (negative) picture frequency, a positive recording picture frequency has to be produced by a corresponding increase of the scanning frequency. Evidently this condition is fulfilled also with the device according to the Austrian Pat. No. 310,832, yet this patent did not teach what would occur with different moving picture frequencies, and respectively, it did not teach that this condition should be maintained even with different moving picture frequencies, although then at least with one of the used moving picture frequencies, fractions of a picture, for example 5/4 pictures, are scanned.

It has proven that opposite to the heretofore existing prejudice in the field, no notable loss in quality results with the teaching and practice of the present invention, since indeed with moving picture films the pictures which are adjacent to each other are almost or practically equal. Consequently it is surprising, that in so simple a manner the previously conventional control expense for the displacement or staggering of the scanning corresponding to the movement of the moving picture can be eliminated by this invention. It has however been shown that precisely here, scanning systems with most extremely small return times are particularly suited; consequently preference is given to use of a per se known optical revolution body or rotational solid, such as a polygonal prism, or a mirror rim, a set of mirrors or drum scanner.

According to another feature of the invention an apparatus is provided for carrying out the method of the invention with a substantially continuous drive for the film, and an optical scanning device, by means of which the film pictures are able to be fed to a recording screen, characterized in the manner that the continuous drive is controllable by means of a per se known speed adjustment device actuatable arbitrarily or at will, and that a constant holding device is provided for holding the recording picture frequency constant.

According to another feature of the invention the constant holding device has a summing or mixing stage for the speed and picture frequency, respectively, of the moving picture film and for the scanning frequency of the optical scanning device.

According to another feature of the invention the constant holding device has two preselectors for the picture frequency and the scanning frequency, respectively, the two preselectors being connected with each other. By means of the preselectors the frequency sources are selectable, which frequency sources produce the desired recording picture frequency.

According to still another feature of the invention the frequency sources are formed by frequency dividers, and an oscillator feeds the frequency dividers.

By another feature of the invention the constant holding device comprises a closed control circuit, the control circuit having a measuring device for the actual recording picture frequency, and the measuring device has an output signal which can be compared with the desired nominal recording picture frequency in a comparator stage, whereby the comparison signal resulting therefrom can be fed to a control device for the optical scanning device and/or to the continuous drive.

According to yet another feature of the invention, the optical scanning device is formed by a per se known body of revolution.

With the above and other objects and advantages in view, the present invention will become more clearly understood in connection with the detailed description of a preferred embodiment, when considered with the accompanying drawings, of which:

FIG. 1 shows the arrangement of a "flying-spot" system in perspective and block schematic illustration;

FIGS. 2A, 2B, 2C and 2D are graph diagrams explaining the relationship given by the invention between the picture field travelling and the scanning; and FIGS. 3, 4 and 5 are different circuit diagrams and devices, respectively, for carrying out the method of the invention.

Figure 3:
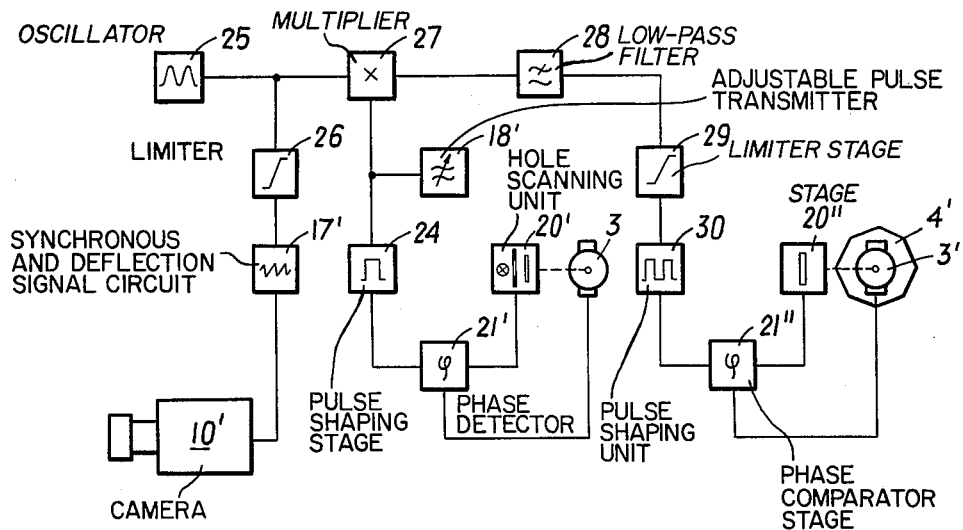

Referring now to the drawings, and particularly to FIG. 1, a film 1 is fed downwardly by means of a toothed drum or sprocket 2 by means of a motor 3 (referring to FIG. 1).

A cathode ray tube 4 is provided as the scanning device, the screen 5 of which is indicated in the drawings. By means of this cathode ray tube 4, a light point is produced. By means of an objective 6 the light spot is focused in the plane of the film 1, the objective 6 being indicated by means of an individual lens (although not limited thereto), and then by means of an additional objective 7 is imaged on a corresponding TV video recorder device 8, the latter device being formed in the illustrated embodiment example by three photocells 9 and circuits 10 required for the processing, so that at the output a video signal V is produced.

In a conventional manner, the cathode ray tube 4 is equipped with vertical deflection devices 11, 12 as well as horizontal deflection devices 13, 14, of which for example the deflection yokes 12, 14 are connected to ground whereas the yoke 11 is connected with the output of a vertical deflection circuit 15. Analogously to this the plate 13 is connected to the output of a horizontal deflection circuit 16. Both deflection circuits 15, 16 are controlled by a synchronous signal generator 17, the frequency of which is adjustable solely by means of an adjustment device 18. The adjustment device is indicated in FIG. 1 by an adjustable resistor.

While now the scanning frequency is freely selectable at the synchronous signal generator 17 by means of the adjustment device 18, by means of a mirror surface 19 (which may be semi-transparent) in the path of the rays between the screen 5 of the cathode ray tube 4 and photoelectric transformers 9, the movement of a perforation hole is determined with respect to the scanning frequency in the manner that the mirror surface 19 projects or reflects the edge of the film 1 which contains the perforation hole row of the film 1 onto a photoelectric transformer 20. By passing by of the perforation holes, impulses pulses arise at the output of the transformer 20, the frequency of the impulses on the one hand being dependent on the scanning speed and on the other hand being dependent on the picture frequency of the film 1. If yet a film is used with several perforation holes per picture, the switching circuit 20 also must contain a corresponding frequency divider.

The output of the switching circuit 20 is compared with the frequency of the synchronous signal generator from the camera 10 in a phase detector circuit 21, and correspondingly the speed of the motor 3 is controlled such that actually the sum of the scanning frequency of the cathode ray tube 4 and the picture frequency of the film 1 corresponds to the recording picture frequency of the camera 10.

Since the scanning picture frequency is freely selectable by means of the adjustment device 18, different operating conditions will occur, which shall be discussed on the basis of FIGS. 2A to 2D.

In the diagrams of FIGS. 2A to FIG. 2D, respectively, the ordinate represent the path S in units of the height of the picture, and the abscisa represents the time t in units of 1/50 seconds. If for example the first picture of the film 1 (FIG. 1) is to be reproduced as a non-moving or stationary picture, correspondingly the picture frequency of the moving picture film $f_L$ amounts to zero, and the scanning frequency must correspondingly be $f_A$ of 50 Hz, in order to produce a recording picture frequency of 50 Hz (corresponding to the television norm). Correspondingly in FIG. 2A the sawtooth curve 22 is illustrated, of which each sawtooth extends over the time of 1/50 seconds. With the arrangement according to FIG. 1 the sawtooth curve 22 corresponds to the output signal of the vertical-deflection circuit 15. With the use of other deflection systems, e.g., by tilt mirrors, the curve 22 corresponds to the (idealized) movement of this system or of the mirror, respectively. A scanning, as it is illustrated in FIG. 2A and with which the amplitude of the sawtooth signal 22 corresponds exactly to the height of one picture, already has been previously done.

Now, however, the condition according to the introductory stated equation also should be maintained or remain the same even with changing picture frequencies. Therefore, in the example according to FIG. 1, if the scanning frequency would be reduced to 40 Hz by means of the adjustment device 18, this would result in the case according to FIG. 2B. By means of the control circuit which has been described on the basis of FIG. 1, the film 1 would be set into movement, its individual pictures execute a movement corresponding to the set of curves 23 in FIG. 2B, of which each curve evidently constitutes an inclined straight line indicating movement of the pictures. The picture frequency $f_L$ then amounts to 10 pictures/second.

According to the previous prejudice prevailing in the field, now the sawtooth signal had to follow this movement of the moving pictures in such a manner that the scanning reverses as soon as the scanning has arrived on the upper edge of a picture which is to be scanned. In this manner there occurred a signal 22a with the prior art, which is drawn in short dashed lines in FIG. 2B, exhibiting sawtooth forms which are offset or staggered and correspond to the picture movement. The necessary circuit of the prior art for this purpose was extraordinarily complicated.

To the contrary the essence of the present invention resides in the recognition that such type of offsetting or staggering of the signal is in no way necessary, since indeed with motion picture films, adjacent pictures usually are extremely similar to one another. Consequently, the introductory-mentioned condition (4th paragraph) according to the present invention can be maintained even here, whereby as now evident, each sawtooth of the signal 22' indeed has an amplitude corresponding to the height of the picture, and consequently the amplitude does not need to be changed with respect to the signal according to FIG. 2A; since however the picture performs an opposite or counter running movement, upon reaching the upper end of the first picture, the sawtooth 22' (FIG. 2B) goes beyond the first picture and then scans a fraction of the bottom of the second picture. On the other hand, the next sawtooth begins shifted correspondingly by a fraction inside of the first picture, and on its upper end reaches approximately into one-half of the second picture. Thus in this manner fractions of adjacent pictures are respectively scanned.

The same applies for the scanning frequency $f_A$ of $33\frac{1}{3}$ Hz and a moving picture frequency $f_L$ of $16\frac{2}{3}$ pictures/second, respectively, according to FIG. 2C where the sawtooth 22'' is shown. Only with a moving picture frequency $f_L$ of 25 pictures/second according to FIG. 2D and a scanning frequency $f_A$ of 25 Hz, respectively, again in a known manner a correspondence of the amplitude of the signal sawtooth 22''' with the picture height of the film is produced, in that with continuing constant amplitude of the signal 22''', the sawtooth reaches its reversing point precisely at the end of every second picture, respectively. This corresponds to a scanning as it is provided according to the Austrian Pat.

No. 310,832. Surprising therefore is only that the introductory-named condition can be maintained absolutely and also can be maintained with any ratio of the moving picture frequency and scanning frequency, as shown in FIGS. 2B and 2C.

FIG. 3 illustrates an embodiment of a device in accordance with the invention which is modified with respect to FIG. 1. Hereby elements having the same function are provided with the same or primed reference numerals, respectively. Thereby by means of an adjustable impulse generator or transmitter 18', the speed of the motor 3 can be freely selected. The arrangement thereby is met or provided in the manner that the signal of the adjustable impulse generator 18' is fed to a phase detector 21' via an impulse forming or shaping stage 24. The output signal of a perforation hole scanning unit 20' is connected to the other input of the phase detector 21'. Instead of the scanning of a perforation hole, naturally also any other signal which is representative of the speed of the film could be used. Correspondingly, instead of the phase detector 21' even any other comparison circuit for control of the motor 3 can be used.

The television camera 10' is triggered or controlled by an oscillator 25, the signal of the oscillator being fed via a limiter 26 to the actual synchronous and deflection signal circuit 17'. There the camera signals are processed in the usual manner. The signals of the adjustable impulse transmitter 18' and of the oscillator 25 are fed to a multiplier stage in the form of a ring modulator 27, whereby at the output of the latter two frequency bands are obtained, of which one is filtered out by means of a low-pass filter 28. The output signal of the low-pass filter 28 is fed via a limiter stage 29 and an impulse former or shaping unit 30 again to a phase comparator stage 21'', on the other input of the which stage 21'' there is connected the output signal of a stage 20''. By means of the stage 20'' the position and phase location, respectively, of the scanning device is determined, the scanning device in this case comprises an optical rotational body 4', such as a mirror rim or set of mirrors in a scanner or drum scanner or a prism of revolution. The ring modulator 27 is required in order to obtain the subtraction result between the recording picture frequency of the recording camera 10 and the moving picture frequency.

Figure 4:
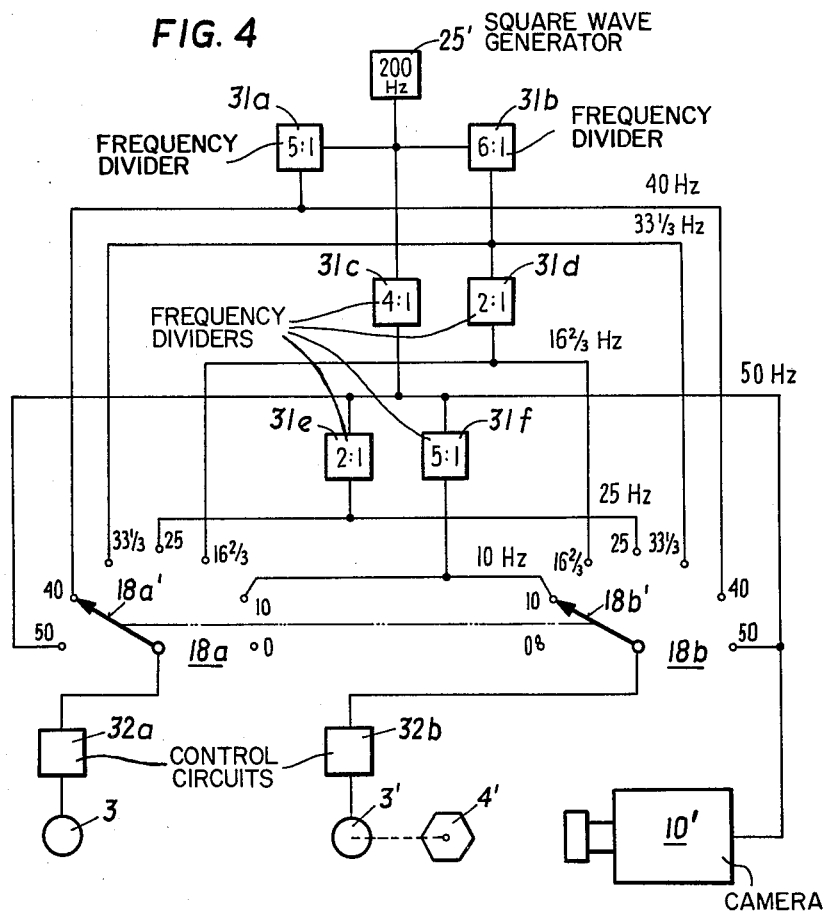

An arrangement which is even more advantageous with respect to FIG. 3 is shown in FIG. 4. In this manner instead of the oscillator 25 controlling all the devices, a square wave generator 25' is provided, which square wave generator operates with a frequency of 200 Hz. At the output of the rectangular generator 25' there are connected a number of frequency dividers 31a–31f by means of which in evident manner the different required frequencies are able to be produced. To the contrary of the previously described embodiment examples thereby, an adjustment is possible only in stages. The outputs of the different frequency dividers 31a to 31f feed two selector switches 18a, 18b, which switches are connected with one another as indicated in dot-dash manner. If therefor the sliding contact 18a' as indicated in the illustrated manner is adjusted to a frequency of 40 Hz, the wiper or slider 18b' lies on a terminal marked 10. From the output of the frequency divider 31f this terminal receives a frequency of 10 Hz. Both sliding contacts 18a', 18b' are connected with control circuits 32a, 32b for the motors 3, 3'. It is evident that the output signal of the frequency divider 31c has a frequency of 50 Hz and is fed not only to one terminal each, of the selection switches 18a, 18b, respectively, but rather also to the television recorder camera 10'.

FIG. 5 illustrates a mechanical device by means of which the correct coordination of the scanning frequency and moving picture frequency can be achieved. In this manner a mirror rim or set of mirrors 4' in a scanner or drum on a shaft 33 is driven by a toothed wheel or gear 34. The gear 34 in its turn obtains its drive from a motor 3' with a constant rotational speed with a motor pinion 35, a planet gear carrier or sun wheel 36 with a planet gear 37 as well as two gear wheels 38, 39. The planet gear 37 engages in the inner toothing of a planet gear cage 40, the latter in its turn being driven via an outer toothing and the pinion 41 of the motor 3, the latter being driven with a speed which can be selected. The planet gear cage 40 in the illustrated embodiment example carries a capstan shaft 2'. The capstan shaft 2' corresponds to the toothed drum 2 of FIG. 1 and drives the film 1. The speed of the motor 3 as well as its direction of rotation are continuously steplessly controllable, so that for the film there is produced a picture frequency between +50 and −50 pictures per second. Correspondingly, the scanning frequency is between zero and one hundred images per second.

It is clear that also the control circuit according to FIG. 3 and FIG. 4 can be formed as closed control circuits. So far the arrangement of the control circuit is to be preferred because of its particular simplicity.

While there has been disclosed several embodiments of the invention, it is to be understood that these embodiments are given by example only and not in a limiting sense.

What I claim is:

1. In a method for video recording of pictures from a moving picture film including the steps of continuously moving the film relative to a recording screen, periodically scanning each of the pictures of the film, respectively, linewise, the moving picture frequency with respect to the scanning frequency being in a predetermined relationship with respect to each other for achieving a predetermined recording picture frequency, the improvement comprising the step of
    maintaining the following relationship with respect to the scanning frequency ($f_A$) with different moving picture frequencies ($f_L$):

$$f_L + f_A = +F$$

wherein F is the desired predetermined recording picture frequency, and
    said step of scanning comprises scanning fractions of a picture per scanning period, at least with one of the moving picture frequencies which is used, said fractions differing from 1 picture per scanning period.

2. The apparatus for carrying out the method according to claim 1, comprising
    a substantially continuous drive means for driving the moving picture film,
    an optical scanning means for scanning the pictures of the film,
    means for feeding the scanned film pictures of the film to a recording screen,
    an arbitrary actuateable speed adjustment means for controlling said continuous drive means,
    means for holding the recording picture frequency constant.

3. The apparatus as set forth in claim 2, wherein said constant holding means includes a summing stage for the speed and picture frequency, respectively, of the moving picture film and the scanning frequency of the optical scanning means.

4. The apparatus as set forth in claim 2, further comprising
frequency sources means for operatively producing a desired recording picture frequency,
said constant holding means comprises, two preselector means for the picture frequency and the scanning frequency, respectively, said two preselector means being connected with each other, said preselector means for operatively selecting said frequency sources means producing the desired recording picture frequency.

5. The apparatus as set forth in claim 4, wherein
said frequency sources means are formed of frequency dividers,
oscillator means for feeding said frequency dividers.

6. The apparatus as set forth in claim 2, wherein
said constant holding means comprises a closed control circuit,
said control circuit includes a measuring means for an actual recording picture frequency,
a comparator means connected to an output of said measuring means, said measuring means has an output signal, said comparator means for comparing therein said output signal with a desired nominal recording picture frequency and for providing a comparison signal,
a control means for receiving the comparison signal and for controlling at least one of said optical scanning means and said continuous drive means.

7. The apparatus as set forth in claim 6, wherein
said optical scanning means comprises an optical body of revolution.

8. The apparatus as set forth in claim 1, wherein
said fractions exceed 1 picture.

9. The method as set forth in claim 1, wherein
said predetermined recording picture frequency is 50 pictures per second.

10. The method as set forth in claim 1, wherein
the amplitude of each scanning per scanning period is constant corresponding exactly to the height of one stationary picture.

11. The apparatus as set forth in claim 2, wherein
said optical scanning means comprises an optical rotational body for providing images of the scanned pictures,
said feeding means comprises a camera means for receiving the images of the scanned pictures,
said speed adjustment means comprises:

a hole scanning means for detecting the holes of the film;
an adjustable pulse transmitter;
comparison means for operatively receiving and comparing pulses from said adjustable pulse transmitter and from said hole scanning means, respectively, and dependent thereon for providing a control signal to said continuous drive means;
a synchronous and deflection signal circuit connected to said camera,
an oscillator operatively connected to said synchronous and deflection signal circuit,
multiplier means operatively connected to said oscillator and to said adjustable pulse transmitter for providing two frequency bands,
a low-pass filter connected to said multiplier means,
a limiter stage and a pulse shaping unit connected in series to said low-pass filter,
stage means for determining the position and phase location, respectively, of said optical scanning means,
a phase comparator means connected to said pulse shaping unit and to said stage means and operatively connected to said scanning means.

12. The apparatus as set forth in claim 2, including
mechanical means for correctly coordinating the scanning frequency and the moving picture frequency comprising,
said scanning means comprises a peripheral set of mirrors,
a toothed gear rotatably connected with said set of mirrors,
a gear member comprising two gears parallel to one another, a shaft coaxially rotatably connects said two gears with one another,
one of said two gears interengages with said toothed gear,
a planet gear carrier is freely rotatably mounted about said shaft,
a motor drivingly engages with said planet gear carrier,
a plurality of planet gears extending from a side of said planet gear carrier,
a capstan shaft means for driving the film,
a planet gear cage rotatably connected to said capstan shaft means, said planet gear cage having an inner gearing substantially coplanar and spaced concentrically relative to the other of said two gears,
said planet gears interengaging simultaneously with said inner gearing of said planet gear cage and with said other of said two gears,
said drive means for driving said planet gear cage.

* * * * *